April 16, 1963   J. M. A. C. BERGE   3,085,333
APPARATUS FOR THE MANUFACTURE OF CHEESE
Original Filed Sept. 14, 1956   2 Sheets-Sheet 1
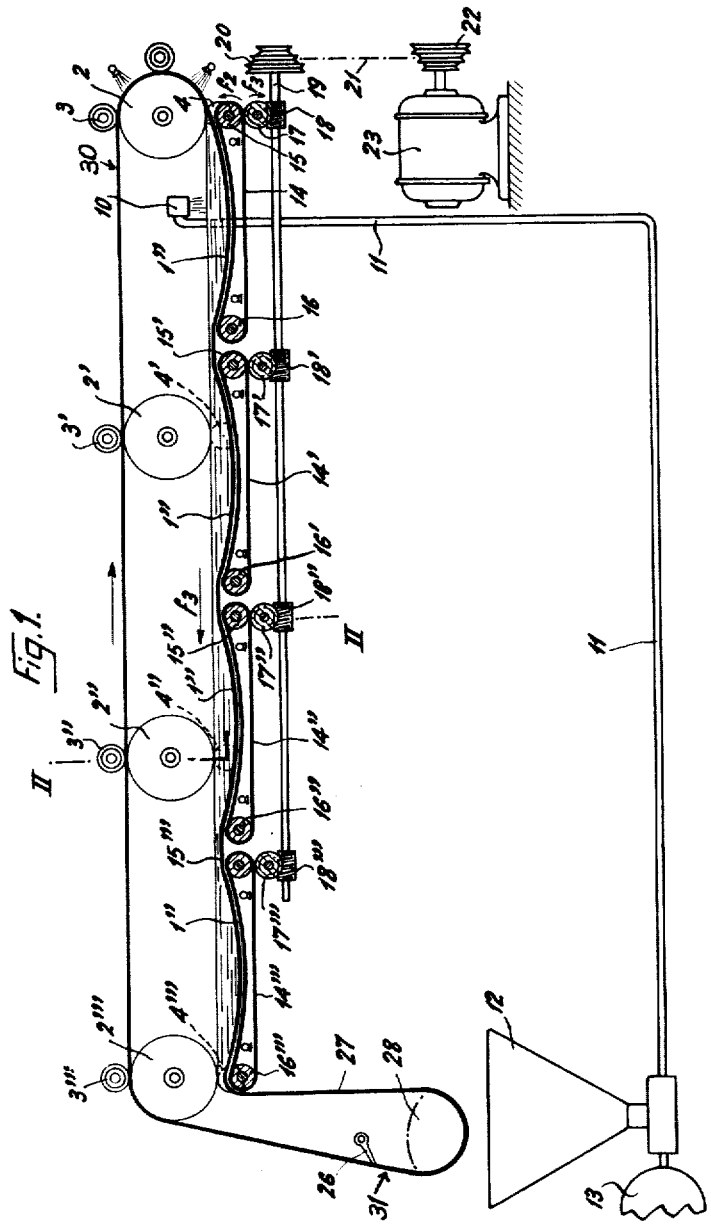
Inventor
Jacques M. A. C. Berge
By Stevens, Davis, Miller & Mosher
Attorneys

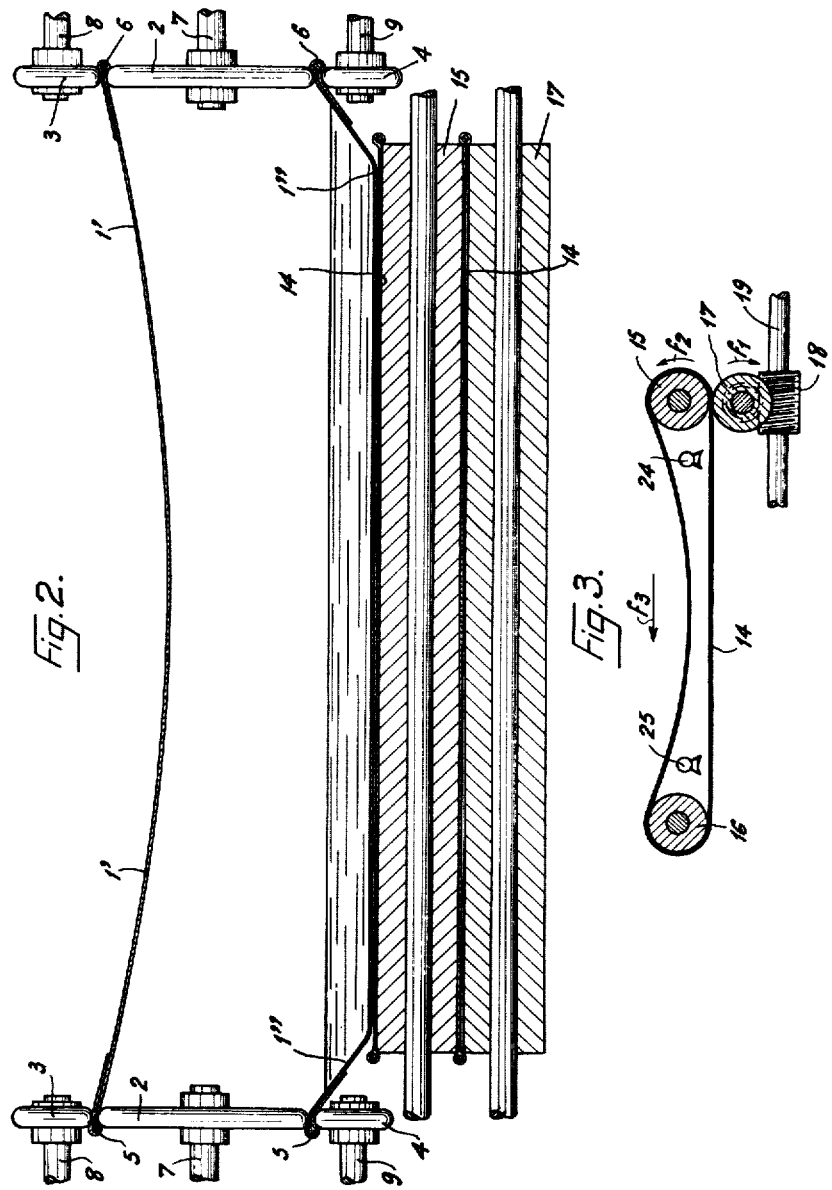

United States Patent Office 3,085,333
Patented Apr. 16, 1963

3,085,333
APPARATUS FOR THE MANUFACTURE
OF CHEESE
Jacques M. A. C. Berge, Prechac, France, assignor to Ch. Gervias, Societe Anonyme, Paris, France, a company of France
Original application Sept. 14, 1956, Ser. No. 609,833, now Patent No. 2,974,045, dated Mar. 7, 1961. Divided and this application Oct. 26, 1960, Ser. No. 70,886
Claims priority, application France Sept. 20, 1955
10 Claims. (Cl. 31—46)

The present invention relates to an apparatus for the manufacture of cream cheese and is a divisional application of application Serial No. 609,833, filed September 14, 1956, now Patent No. 2,974,045.

It is known that in the continuous manufacture of cream cheese, a very important operation is employed which determines the quality of the final product, and which consists in draining the curds. The phenomenon of capillary action and other effects inherent therewith play a fundamental part in this operation. The direct contact of a filter cloth absorbs the moisture in an almost instantaneous manner, which the texture of this cloth is able to absorb on the surface of contact. This ability of a fabric to suck up the moisture by contact is of course due to capillary action.

When the texture of the filter cloth has effected the absorption which corresponds to its absorbing capacity, which is a function of the phenomena of capillary action inherent in the nature of the fabric, it obviously becomes impossible for it to suck up any supplementary moisture. Its function for this purpose thus ceases at this moment. It can only begin to function once more if care is taken to evacuate all moisture which would prevent this supplementary absorption or if it is possible to obtain a super-saturation of the filter with moisture.

If a compression force is applied to the mass of curds in order to compel its residual moisture to super-saturate the filter, this force acts indiscriminately on the moisture and on the dry material to be preserved, which inevitably results in losses. In order to avoid these losses becoming too considerable, it becomes necessary to proceed to a slow filtration. This however has an adverse effect on the quality of the product. In addition, the intimate and prolonged contact between the residual serum and the dry material gives rise to digestion phenomena which also result in losses.

The best method is still undoubtedly the progressive evacuation of the moisture contained in the filter cloth. It is evident, in fact, that if the texture of the filter could continuously retain the power of absorption which it possesses in the dry or substantially dry state, that is to say in the state which existed at the moment when the curds have been brought into contact with it, the absorption of moisture would take place in an automatic and continuous manner and with considerably increased rapidity. Any action of compression would in that case become useless. It would also be necessary that such evacuation should be effected in a selective manner with respect to the dry material to be retained.

The method in accordance with the invention enables precisely a solution of this kind to be obtained.

This method is especially characterised in that it consists in effecting the draining operation by applying to the face of the cloth or other material constituting the filter for the curds or the like, opposite to that in contact with the curds, a layer of supplementary material adapted to absorb by capillary action the moisture which accumulates in the filter, this layer of material being subjected to periodic or continuous wringing in order to free it from the moisture absorbed.

In accordance with a further feature of the invention, the supplementary layer referred to above is displaced due to its contact with the material of the filter and is then passed through a wringing device.

In accordance with still a further feature of the invention, the displacement of the supplementary absorbent layer referred to is transmitted to the band forming the filter solely by contact and the resistance to friction between the two absorbent materials.

It will immediately be apparent that, by virtue of the invention, the material of the filter is automatically and continuously freed from an excess of moisture, and it thus becomes possible to carry out a complete and rational draining of the curds.

The invention is also directed to an apparatus which enables the above-described method to be carried into effect. This apparatus is especially characterised in that it comprises a filter formed by a layer of filter cloth of an absorbent nature, one face of which receives the curds, and a second supplementary layer or sheet also constituted by an absorbent material applied against the face of the filter cloth opposite to that which is in contact with the curds, a suitable device being provided to ensure continuous or periodic wringing of this latter sheet.

Other features of the invention will become apparent from the description which follows below.

In the accompanying drawings, which are given by way of example only.

FIG. 1 shows in longitudinal cross-section an apparatus in conformity with the invention.

FIG. 2 is a cross-section of the same apparatus taken along the line II—II of FIG. 1 and showing the same on a larger scale.

FIG. 3 shows a detail to a larger scale.

In the example of construction shown, the apparatus comprises in the first place a cloth, for example of the endless type 1 having a head portion at 30 and a tail portion at 31, constituted by an absorbent filtration material adapted in consequence to absorb liquid, and guided by rollers 2, 2′, 2″, 2‴, cooperating with rollers 3—4, 3′—4′, 3″—4″, 3‴—4‴. These various rollers are mounted as shown in FIG. 2. Thus, the upper layer 1′ of the endless band which forms the filter is terminated at its extremities, at 5 and at 6, by rolls which are engaged behind the two rollers 3 and 2. The same rolls or pads 5 and 6 are also engaged, with respect to the lower sheet 1″, between the rollers 2 and 4. In this way, when the cloth is moved in the longitudinal direction, the edges 5 and 6 are guided by the rollers placed laterally and the sheet can then not make any untimely lateral movement which would have unfortunate consequences. The various rollers 2, 3 and 4 are respectively mounted on shafts 7, 8 and 9 which are fixed in a suitable manner. In the example chosen, these rollers rotate freely on their axes.

The incoming supply of curds is shown at 10 and is effected for example by means of a pipe 11 supplied from a hopper 12. This hopper is supplied either with new curds or with pulp which has already circulated once through the apparatus in accordance with the invention. The circulation is effected by a pump 13, for example.

Below the lower side 1″ of the filter layer, there is placed, in accordance with the invention, a series of devices intended to absorb the moisture which is soaked up by the said side. These devices are formed by zones comprising endless bands 14 of absorbent material such as a suitable fabric, which passes over two rollers 15 and 16 respectively comprising a head drum and a tail drum, around which it is wound. Below the roller 15 is arranged a roller 17 which plays the part of a wringer and is operated by a suitable toothed wheel co-operating with an endless screw 18, which is itself actuated by a driving shaft 19 driven for example by a pulley 20 cooperating with a belt 21 and a further pulley 22 driven by a motor 23.

It will of course be understood that spray devices for rinsing or washing, such as those shown at 24 and at 25 in FIG. 3, may be mounted inside the absorbent sheet and serve to clean it. In the same way, it is simple to provide cleaning devices for the filter cloth and especially a scraper 26 for example, which may be adjustable. This scraper is preferably mounted inside a loop 27 formed by the sheet at one of its extremities in which collects a roll of pulp shown at 28 in FIG. 1.

The operation of the apparatus which has just been described is very simple. In fact, that curds are first placed on the filter sheet and more especially on the lower side 1″ of this sheet. The curds may be introduced in any convenient manner and at an appropriate rate of feed. In the example chosen, the curds are discharged at 10 and the sheet takes a certain sag as shown, between the rollers 15 and 16 on the right hand side of FIG. 1. At the same time, the motor 23 is started up and this drives the pulley 22 and thence the shaft 19. The wringing roller 17 is then started in motion in the direction of the arrow $f_1$. This movement not only enables the absorbent sheet 14 to be wrung, but in addition, by reason of the contact between the rollers 15 and 17, drives the roller 15 in the direction of the arrow $f_2$. The sheet 14, the upper side 14′ of which is in contact with the lower side 1″ of the sheet 1, drive the latter by reason of the friction produced between these two sheets. The result is thus that the sheet 1 advances automatically in the direction of the arrow $f_3$ with a slow movement which is however sufficient to ensure the transport of the curds. The passage of the moisture from the sheet 1 to the sheet 14 takes place by capillary action.

There has been shown on FIG. 1 the absorbent member constituted by the separate sheets 14, 14′, 14″, 14‴, but it is quite clear that the number of these sheets can be infinitely varied and that the latter may have the same length or they may have different lengths.

As the movement continues, the curds which are located on the lower side 1″ of the filter sheet arrive at the extremity, that is to say at the level of the rollers 2‴, after which it is discharged into the loop 27 which is formed by the sheet at this point, and takes the form of a roller 28 of pulp. This roller may be delivered either into the hopper 12 to pass a second time so as to be drained again, or it may be led towards later operating stages. It is at this point that the scraper 26 is mounted, its movement being regulatable at will and serving to clean the filtering sheet.

The moisture content of the final product may be controlled in a very simple manner by acting either on the rate of supply of the curds, or on the speed of movement of the filter or of the supplementary sheet.

The filtering sheet and also the absorbent sheet may of course be made of any textile or other appropriate material, the essential condition being that it should have an adequate absorbing power by capillary action, in order to be able to absorb the moisture extracted from the curds during their passage through the said apparatus.

The invention is, of course, in no way limited to the form of construction shown and described, this form having been given by way of example only.

What I claim is:

1. Apparatus for continuously draining liquid from cheese curds comprising an endless first absorbent filter web having a head portion and a tail portion carrying curds from said head portion to said tail portion of said web, a supplementary absorbent filter web in contact with said first absorbent filter web substantially on the entire length of said first absorbent filter web on the side opposite to the side carrying the curds, means moving said first absorbent filter web and said supplementary absorbent filter web substantially at the same speed between said head portion and said tail portion, and means removing liquid from the supplementary filter web in at least two spaced zones.

2. The apparatus of claim 1 wherein the edges of said absorbent filter webs are provided with guiding means adapted to cooperate with suitably journalled means.

3. The apparatus of claim 1 wherein washing means is provided for rinsing the supplementary filter webs.

4. The apparatus of claim 1 wherein one end of the first endless filter web describes a downwardly extending loop into which the drained curds are discharged.

5. Apparatus as described in claim 1, comprising means for distributing liquid containing curds near substantially the head portion of said cradle.

6. Apparatus as described in claim 1, in which the means for removing liquid from said supplementary filter web are constituted by pairs of pressing rolls.

7. Apparatus as described in claim 1, in which said supplementary absorbent filter web comprises a plurality of adjacent endless absorbent belts, the upper runs of which being in contact with said first absorbent filter web, on the side opposite to the side carrying the curds, and in contact with the underside of said first absorbent filter web, each of these endless absorbent belts being wound on two return drums, respectively on a head drum and on a tail drum, means being provided on each of said endless absorbent belts for removing liquid from said endless absorbent belts.

8. Apparatus as described in claim 7, in which said means for removing liquid from each of said endless absorbent belts comprise a press roll applied against one of said return drums.

9. Apparatus as described in claim 8, in which the driving motion of said first absorbent filter web and of said endless absorbent belts is transmitted through said endless absorbent belts.

10. Apparatus as described in claim 9, in which said press rolls for removing liquid from said endless absorbent belts are identically connected to a common driving rod.

References Cited in the file of this patent

UNITED STATES PATENTS

| 712,347 | Wheelwright | Oct. 28, 1920 |
| 1,626,041 | Kyle et al. | Apr. 26, 1927 |
| 2,097,529 | Nordell | Nov. 2, 1937 |
| 2,549,729 | Wallny | Apr. 17, 1951 |

UNITED STATES PATENT OFFICE
CERTIFICATE OF CORRECTION

Patent No. 3,085,333                      April 16, 1963

Jacques M. A. C. Berge

It is hereby certified that error appears in the above numbered patent requiring correction and that the said Letters Patent should read as corrected below.

In the grant, lines 2 and 12, and in the heading to the printed specification, line 5, for "Ch. Gervias, Societe Anonyme", each occurrence, read -- Ch. Gervais, Societe Anonyme --.

Signed and sealed this 7th day of April 1964.

(SEAL)
Attest:

ERNEST W. SWIDER
Attesting Officer

EDWARD J. BRENNER

Commissioner of Patents